United States Patent [19]

Weber

[11] Patent Number: 5,787,400

[45] Date of Patent: Jul. 28, 1998

[54] METHOD FOR IMPLEMENTING ELECTRONIC DATA INTERCHANGE (EDI) IN THE PROCESSING OF MANIFESTS AND PARCEL INQUIRY/RESPONSES FOR MULTIPLE CARRIERS IN A PARCEL PROCESSING SYSTEM

[75] Inventor: Tracy A. Weber, Southbury, Conn.

[73] Assignee: Pitney Bowes Inc., Stamford, Conn.

[21] Appl. No.: 359,143

[22] Filed: Dec. 12, 1994

[51] Int. Cl.⁶ .......................... G06F 153/00; G06F 13/00
[52] U.S. Cl. .................. 705/1; 705/21; 705/407; 707/507
[58] Field of Search ................ 364/400, 401 D, 364/464.01–464.03, 466; 395/500, 600, 275, 200.59–200.61, 200.67; 705/1, 21, 407; 707/507

[56] References Cited

U.S. PATENT DOCUMENTS

| 5,040,132 | 8/1991 | Schuricht et al. ............... 364/523 |
| 5,202,977 | 4/1993 | Pasetes, Jr. et al. ............ 395/500 |
| 5,586,037 | 12/1996 | Gil et al. ...................... 705/407 |
| 5,631,827 | 5/1997 | Nicholls et al. ................ 705/28 |
| 5,694,546 | 12/1997 | Reisman et al. ................ 395/200.9 |

*Primary Examiner*—Frantzy Poinvil
*Attorney, Agent, or Firm*—Melvin J. Scolnick; David E. Pitchenik; Robert H. Whisker

[57] ABSTRACT

The subject invention relates to the generation, transmission, reception and/or use electronically, of parcel manifest and inquiry data over a carrier management or shipping system that utilizes electronic data interchange or EDI. This generation, transmission, reception and/or use of EDI will replace or reduce the current methods of using paper manifests and manual phone inquiries associated with carrier management and shipping systems.

24 Claims, 18 Drawing Sheets

METHOD FOR IMPLEMENTING ELECTRONIC DATA INTERCHANGE (EDI) IN THE PROCESSING OF MANIFESTS AND PARCEL INQUIRY/RESPONSES FOR MULTIPLE CARRIERS IN A PARCEL PROCESSING SYSTEM

BACKGROUND OF THE INVENTION

The subject invention relates to the generation, transmission, reception and/or use electronically, of parcel manifest and inquiry data over a carrier management or shipping system that utilizes Electronic Data Interchange or EDI. This generation, transmission, reception and/or use of EDI will replace or reduce the current methods of using paper manifests and manual phone inquiries associated with carrier management and shipping systems.

Both carriers and shippers have begun taking advantage of the benefits of EDI use; the end customer benefits as well when they can utilize order entry and parcel tracking through EDI. Therefore, it is advantageous to provide for shipping of parcel traffic by one or more carriers selected from a group of carriers.

Carrier Management Systems such as that described in U.S. Pat. No. 5,040,132, SYSTEM FOR PREPARING SHIPPING DOCUMENTS, issued Aug. 13, 1991 to Schuricht et al., are well known to the art. One such system is the E900 Carrier Management System, developed and marketed by the assignee of the present application. The E900 generally includes as peripheral elements: a microprocessor; keyboard; monitor; platform scale; printer; and possibly a scanner. The E900 system automatically prepares documents for shipping articles to any desired number of different receivers by any selected carrier or mode.

The EDI process can be simply defined as the electronic alternative to paper documentation. EDI utilizes electronic communication between the application(s) of one computer and those of another to exchange data, or business documentation in a structured format. This communication can be used to replace or supplement current and past methods that utilize paper files.

EDI documentation can be sent directly from one computer to another over a variety of commercially available and proprietary communication links. The commercial EDI standards are maintained by various standards maintenance organizations. In general, EDI provides a number of benefits which include: (i) the speed of transmission and reception; (ii) the accuracy associated with reduced intervention, thus documents are received as they had been transmitted; (iii) increased productivity resulting from time savings and cost reduction; and (iv) within the shipping environment, the manifest data becomes more relevant in that EDI permits documentation to be prepared on the receiving end in advance of parcel arrival which allows for better control of inventory and security procedures.

EDI generally consists of three essential elements; these are: (i) the EDI communication standards, which can be proprietary (as long as both the sending and receiving stations are using the same protocol) or which can utilize one of several international standards; (ii) some means of communication; i.e., a sending station and a receiving station; and, (iii) an EDI translation system.

The EDI standards to be considered can be divided into formatting standards, dictionary standards, and communications enveloping standards.

The formatting standards utilized will govern: (i) what documents can be communicated; (ii) what information is to be included; and, (iii) how the information is to be sequenced and presented.

Dictionary standards specify the meaning of the various elements which are being combined by the formatting standard.

Communications enveloping standards define how to group documents together into larger units and can provide added security by requiring a password or code for transmission or reception. Communications enveloping is convenient in both time and cost because it batches communications that have both a common destination and a common source.

The standards employed for EDI are based on the concept of simple building blocks that combine to form a unique structure, much as in the building of complex chemical structures from the union of simple molecules. Beginning with a basic unit of data called a data element, the data elements can then be grouped into compound data elements. Compound data elements are grouped into data segments, which in turn are grouped into loops; and, loops and data segments are grouped into a business document.

Data segment diagrams include the following components: the data segment identifier identifies the data segment being specified; the data element separator is a user-selected character that precedes each constituent data element and serves as a position marker; and, the data segment terminator is a user selected character used to signify the end of the data element. Element diagrams describe individual data elements.

Depending on the standard, element diagrams can define an element's name, a reference designator, a data dictionary reference number specifying the location in a data dictionary where information on the data element can be found, a requirement designator (either mandatory, optional, or conditional), and a length (minimum and maximum number of characters). A data element dictionary within the program gives the content and meaning for each data element.

EDI standard documents are electronically packaged or "enveloped" for transmittal from one location to another. Enveloping can take place at several levels.

The first level of enveloping separates one document from another. This is accomplished by attaching transaction set headers and transaction set trailers to each transaction set.; the transaction sets could be formatted documents or simply data listings. At a second level of enveloping, documents can be packaged together into groups known as functional groups. Each functional group is packaged with a functional group header at its beginning and a functional group trailer at its end. This second level of enveloping is an optional level in most standards. At a third level of enveloping, all functional groups with the same destination can be batched together. This enveloping consists of an interchange header and an interchange control trailer which set the functional group boundaries.

The second component of EDI is the means of communication. EDI standard documents are transmitted electronically between a sending and a receiving computer.

The third component of EDI is the EDI translation system, which is implemented through EDI translation software that is commercially available from such developers as American Business Computer, of Ann Arbor, Mich.

Translation of EDI documentation, both inbound and outbound, has been the focus of much of the EDI business literature and the EDI prior art. For example, U.S. Pat. No. 5,202,977, issued to Pasetes, Jr. et al., discloses a language based translation system for use in the EDI environment in which data is received in a specific format, is translated in accordance with a script and then transmitted in a second format to another destination. The system provides flexible translation between EDI documents and application documents with differing data structures.

An object of the present invention is to overcome limitations of the prior art by providing a ready means for carriers, shippers and end-customers to participate in the EDI process for the purpose of managing the movement of parcels, maintaining manifest integrity and tracing parcels enroute from shipper to end-customer via carrier.

SUMMARY OF THE INVENTION

According to the invention, the above object is achieved and the disadvantages of the prior art are overcome by a method for implementing one of a plurality of electronic data interchange (EDI) standards in the processing of manifests and parcel or inquiry responses for a plurality of carriers.

A preferred embodiment of the present invention, can utilize as a platform the E900 Carrier Management System developed and marketed by Pitney Bowes Inc. of Stamford, Conn. who is the assignee of the present application. The E900, as with other typical systems in the art, generally includes as its elements: a microprocessor with associated hard drive; keyboard; monitor; platform scale; printer; modem; and possibly a scanner. The system automatically prepares documents for shipping articles to any desired number of different receivers as determined by selected carrier or mode.

The present invention enables a shipper's parcel processing system to utilize one or more of a plurality of electronic data interchange standards when in communication with another parcel processing system. At the end of the day, or whenever required, the system operator would select a particular carrier or class of service for which a manifest is required. The system operator would indicate to the system a request to send the resulting manifest via electronic data interchange. The parcel processing system would determine whether or not the selected carrier possessed an electronic data interchange capability that had been embedded and enabled within the shipper's parcel processing system. The shipper's system would have to have the compatible EDI standard.

The parcel processing system would reject the carrier if the selected carrier did not possess a corresponding electronic data interchange capability; and, would accept the selected carrier if the selected carrier did possess a corresponding electronic data interchange capability. The system would: read from a database those fields necessary to construct a manifest in a format conforming to the requirements of the selected carrier; then, would translate the constructed manifest into the proper electronic data interchange standard; select a transmission program; and, then transmit the translated manifest.

A confirmation of the manifest transmission is sent to the shipper's parcel processing system from the carrier's corresponding parcel processing system and the received confirmation is recorded in an EDI status log.

Within a parcel processing environment, the generation of a manifest is usually reserved for the end of the working day or shift so that the packages prepared for shipment can be shipped. The systems operator would generally select an appropriate End of Day process to construct the manifest. The End of Day process required for a particular carrier is selected by the parcel processing system and the systems operator can select an electronic manifest, paper manifest, or both from within the End of Day process.

Once a specific electronic manifest has been designated, the system searches among a plurality of memory locations within the parcel processing system for the fields necessary to construct the manifest in a format that conforms to the requirements of the selected carrier. The system constructs the electronic manifest and then translates the manifest into an electronic data interchange standard that matches that of the corresponding parcel processing system at the carrier site. The system next selects a transmission program to transmit the translated manifest, and then runs the transmission program.

The transmission program links the shipper's parcel processing system with that of the carrier's. The transmission is done over a conventional PSTN or via a direct line if required. The status of the transmission is displayed to the systems operator over a monitor, a remote display, by printer, or some combination of the three. In addition, the transmission status, as well as any acknowledgment sent by the receiving system, is logged into the EDI status log for subsequent reconciliation or accounting.

The EDI Status Log report contains a history of all EDI functions used for status and tracking. Primarily, it is a history of EDI requests and their corresponding transmissions. The names of the routines to be executed are included in the Status Log Report so that these routines can be linked back to the Traceable Carrier Service which has been set up in the system database.

DETAILED DESCRIPTION OF THE PREFERRED EMBODIMENTS

Figure 1:
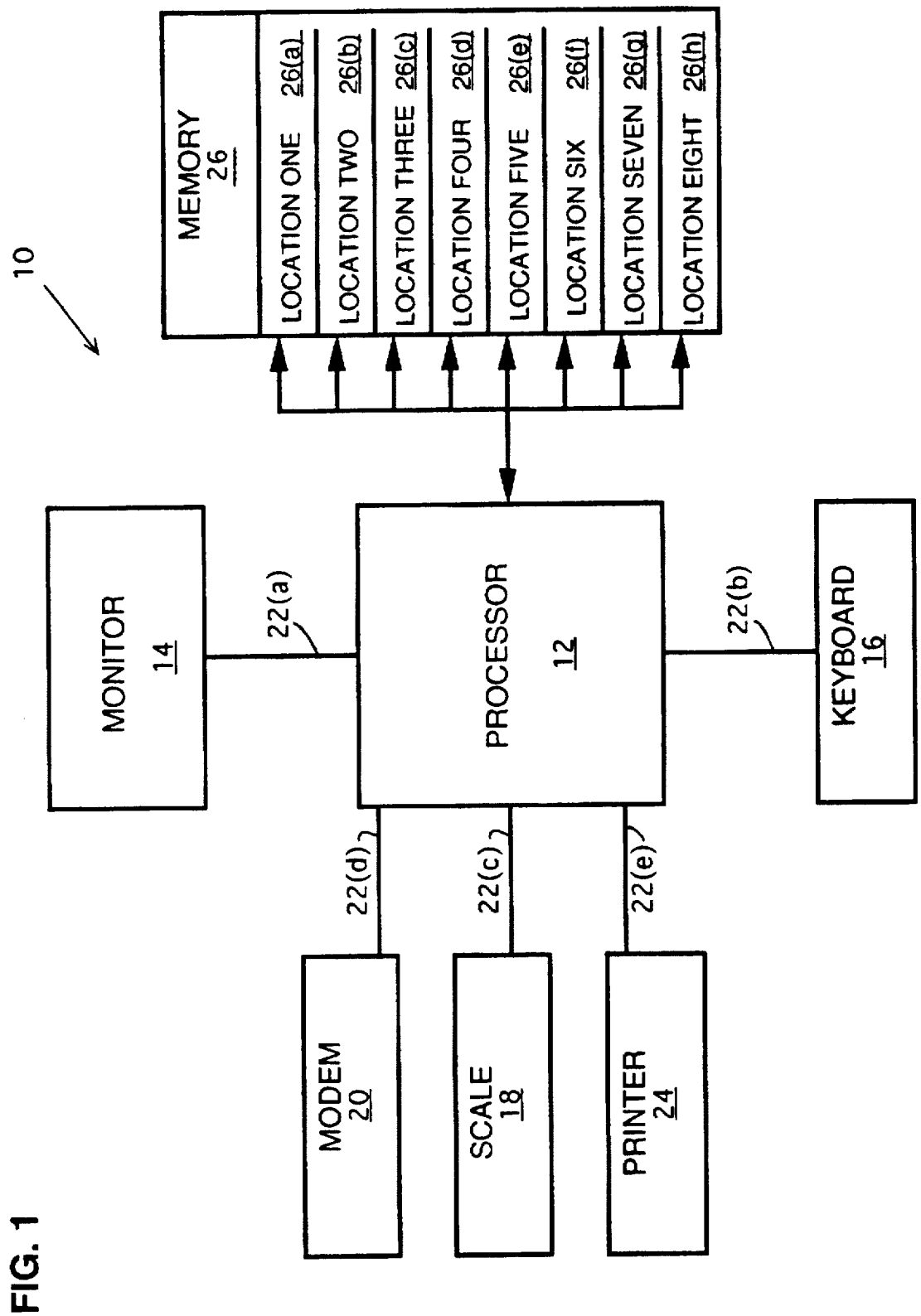
FIG. 1 is a flowchart of a carrier management system which may incorporate the present invention.

Turning to FIG. 1, carrier management system 10 includes: microprocessor 12 connected to monitor 14 by serial interface cable 22a; keyboard 16 connected to microprocessor 12 by serial interface cable 22b; platform scale 18 connected to microprocessor 12 by serial interface cable 22c; modem 20 connected to microprocessor 12 by serial interface cable 22d; printer 24 connected to microprocessor 12 by serial interface cable 22e; and, microprocessor 12 is operatively linked to memory storage means 26 which is divided into a plurality of memory locations. FIG. 1 shows an embodiment of the memory storage means 26 showing eight memory locations 26a–26h.

Figure 2:
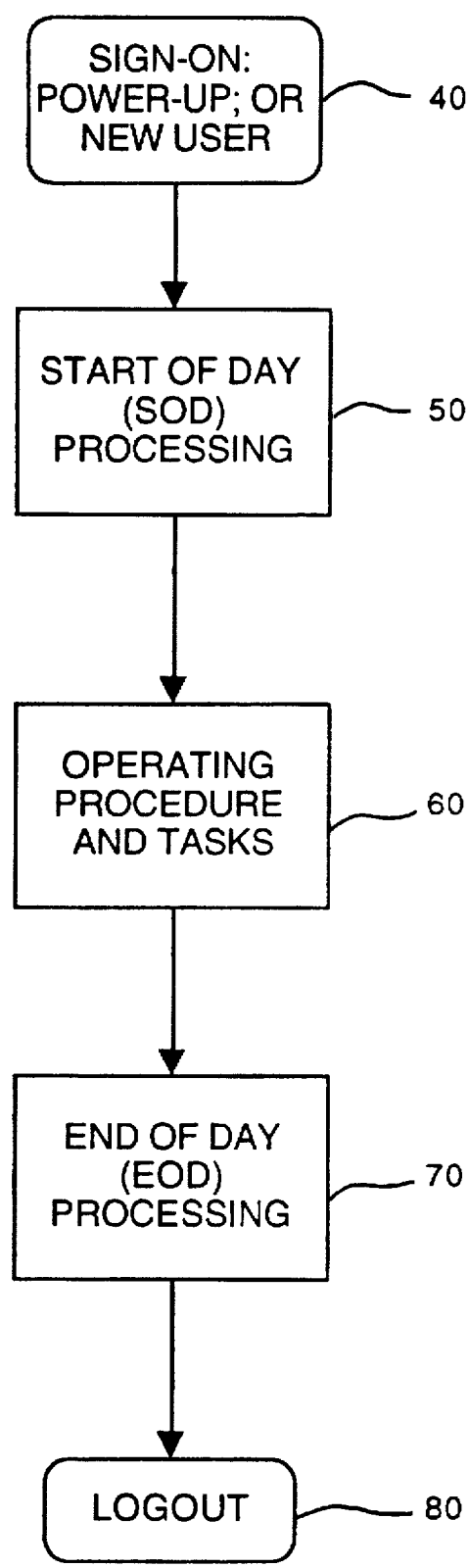
FIG. 2 is a flowchart of the process to be employed while utilizing the system of FIG. 1.

FIG. 2 is a high level flow chart of the process to be employed within the system of FIG. 1. The system operator performs the routine step 40 of logging on to the carrier management system 10 and then selects the Start of Day (S.O.D.) program at step 50 that will allow the carrier management system 10 to begin collecting data that will be used to generate a manifest at the End of Day (E.O.D.) process 70, or when called upon to do so. The operator will employ the operating procedures and tasks 60 required to collect the data required by the carrier management system 10 and the needs of the manifest until the E.O.D. 70 is selected. These operating procedures and tasks 60 are well known in the art. The E.O.D. process 70 will allow, among other things: the printing of a paper manifest for the use of the shipper and the carrier; the transmission of data in the form of a manifest or other documentation via the Electronic Data Interchange (E.D.I.) process; or both. The E.D.I. process simply requires a transmitting location and a receiving location. Between the two locations files can be transmitted and received with status inquiries and status replies being exchanged as well. The system operator can log out 80 upon completion of the carrier management system 10 required tasks.

Carrier management system 10 is used to prepare shipping documents and provide a platform for the routine from which the invention of the present application is selected for implementation. The process begins in FIG. 3 with selection of the Start of Day (S.O.D.) program from a system menu at step 100. During the systems initialization procedure which is run whenever a new systems operator is logged on, or a system reboot is performed, a check is done as to whether the EDI feature has been enabled in the system. The routine will move to step 102 where, transparent to the system operator, it will ask itself if the EDI feature has been enabled. If the response is "No" because EDI is not enabled in the system, then no further EDI related processing is done and the routine advances to step 112. If the response is "Yes" at step 102 because EDI is enabled in the system, then the routine moves to step 104 where the name of the first EDI Start of Day (S.O.D.) program is located.

Carrier management system 10, as determined by arbitrary ranking of the choice of carrier or by a preference ranking if one has been established within the system, selects the S.O.D. program at step 104, and runs the S.O.D. program at step 106. The flow from step 106, of the S.O.D. program selected at step 104, is further described in detail hereinbelow and in FIG. 3(a); the routine returns at step 140 to step 110.

The carrier management system 10 asks the system operator at step 110 if another S.O.D. program exists; if "Yes," then the next S.O.D. program is selected in step 108 and the next selected S.O.D. program is run at step 106. If the response to step 110 is "No," then the program returns at step 112 to allow the system operator to perform operating procedures and tasks 60.

The operating procedures and tasks 60 of a typical carrier management system are well described in U.S. Pat. No. 5,040,132, SYSTEM FOR PREPARING SHIPPING DOCUMENTS, issued Aug. 13, 1991 to Schuricht et al.; those procedures are incorporated herein by reference.

Figure 3:
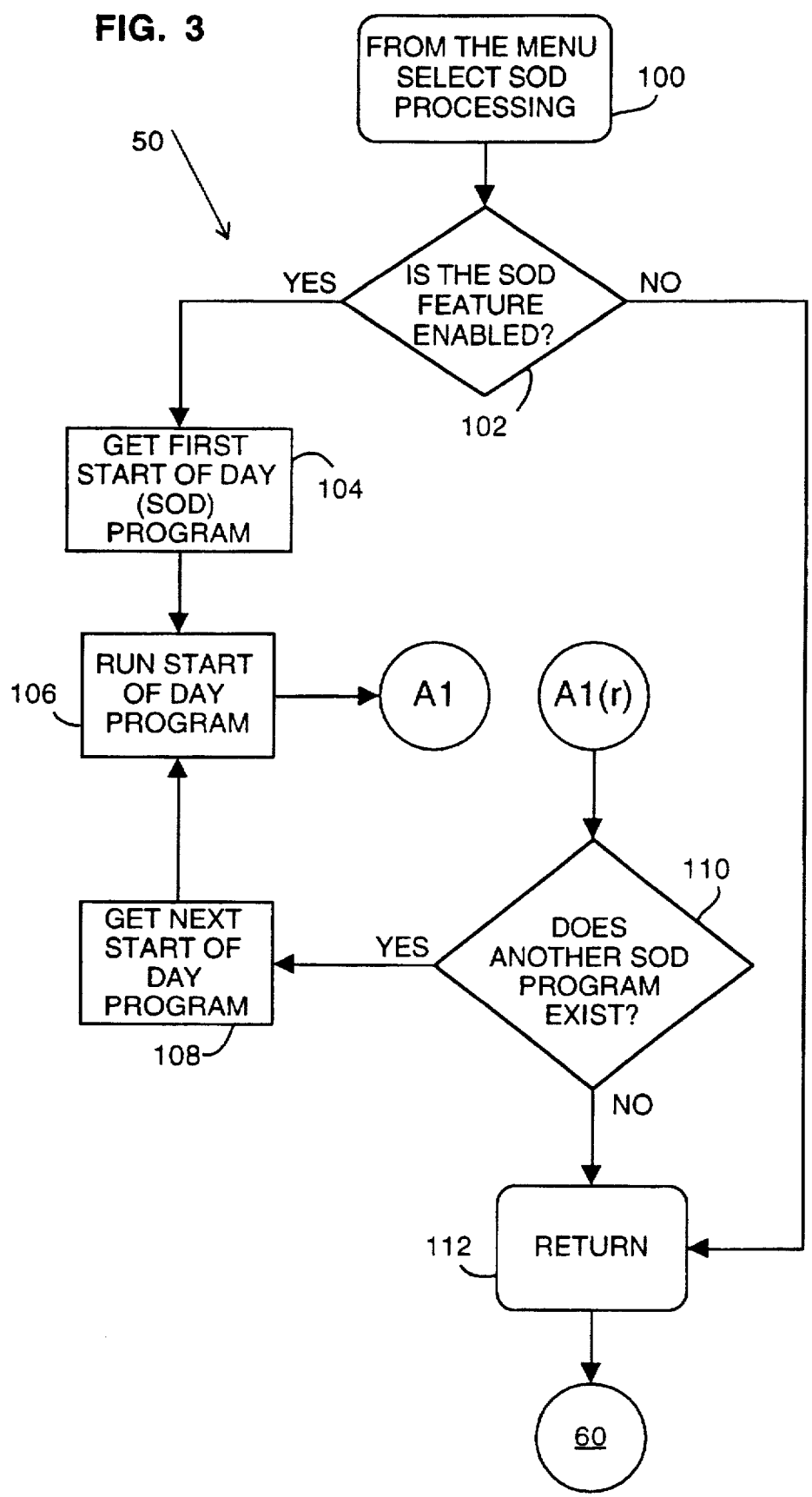
FIG. 3 is a high level flowchart of the Start of Day program employed within the system.
Figure 3A:
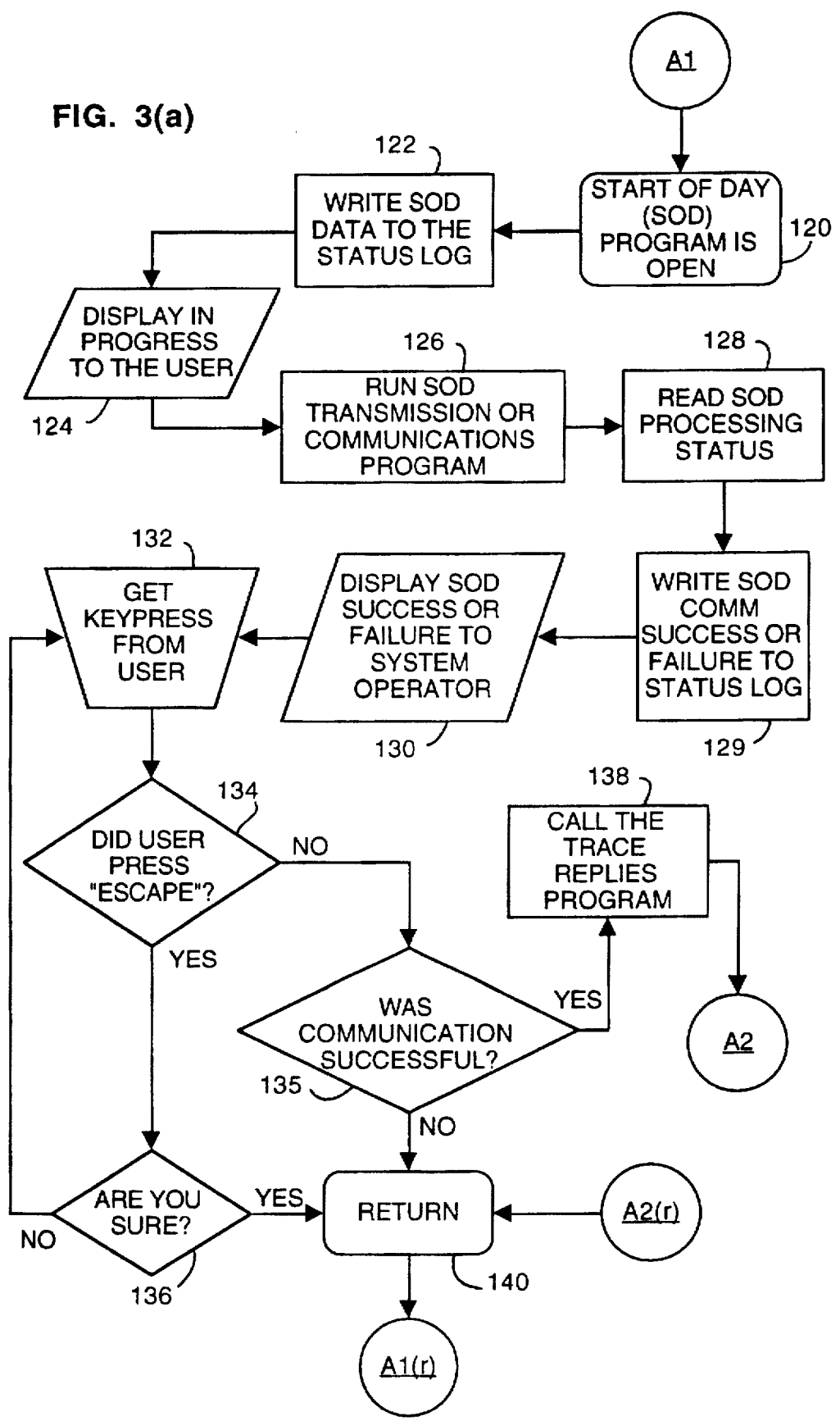
FIG. 3(a) is a more detailed flowchart of the Start of Day program.

FIG. 3(a) illustrates the flow of the Start of Day (S.O.D.) program. The appropriate S.O.D. program, based on choice of carrier, has been selected at step 104 and is run at step 106. When the S.O.D. program is initialized at step 120, the S.O.D. data (name of selected program, date and time) is written to the EDI status log at step 122; this begins the entry of data into the status log so that responses to queries received after the previous End of Day (E.O.D.) can be entered and accounted for. The EDI status log is an audit trail of all EDI activities. The status log can be used to report success or failure of data transmissions, duration of data transmissions, and the frequency and content of those transmissions. The writing of the S.O.D. data to the status log is displayed as "in progress" on monitor 14 to the system operator at step 124. Once the systems operator has been notified that the communications is "in progress," then the actual communication process or handshake between the carrier management system 10 (local site one) and the destination location (remote site two) begins at step 126. The S.O.D. communications program performs the necessary calls for data translation and the appropriate communications protocols.

Once the communications process is completed, the status of the S.O.D. communications process is read by the system at step 128 and is written to the EDI status log at step 129 and displayed to the system operator on monitor 14 at step 130 as either a communication success or as a communication failure. This does not indicate anything about the status of the transmission itself. It is during step 128 that it is determined whether or not the hookup between the local and remote sites has been successful. While the data is being displayed on the screen of monitor 14, the data on the screen remains static so that the data can be read and then reacted to. At any time while step 130 is occurring, the system operator can react to the data displayed in step 130 by pressing any directional key or ESCAPE on keyboard 16 at step 132. The carrier management system 10 asks itself at step 134 if the system operator has pressed ESCAPE; if "Yes," then the routine queries "Are You Sure" at step 136. If the system operator responded "Yes" at step 136, then the program returns via step 140 to step 110; and, if desired, from step 110 to step 60 via step 112. This would allow the system operator to stop all remaining S.O.D. processing so that the operator can get to step 60 in order to process parcels.

It is important that the operator be given the ability to stop the S.O.D. process because if the communications link between the local site one and remote site two (or any of a possible plurality of sites) is continuously failing then the operator could be stuck in a potentially endless loop of unsuccessful attempts to communicate. S.O.D. processing could be initiated again if another S.O.D. program were selected at step 110.

If the system operator answered "No" at step 136, then the routine returns to step 132. If the system answered "No" at step 134, then the routine advances to step 135 with the query: "Was Communication Successful?" If the system operator responded "Yes" at step 135, then the program returns via step 140 to step 110. If the system operator responded "No" at step 135, then the routine calls the Trace Replies program, after which it will return via step 140 to step 110.

Figure 3B:
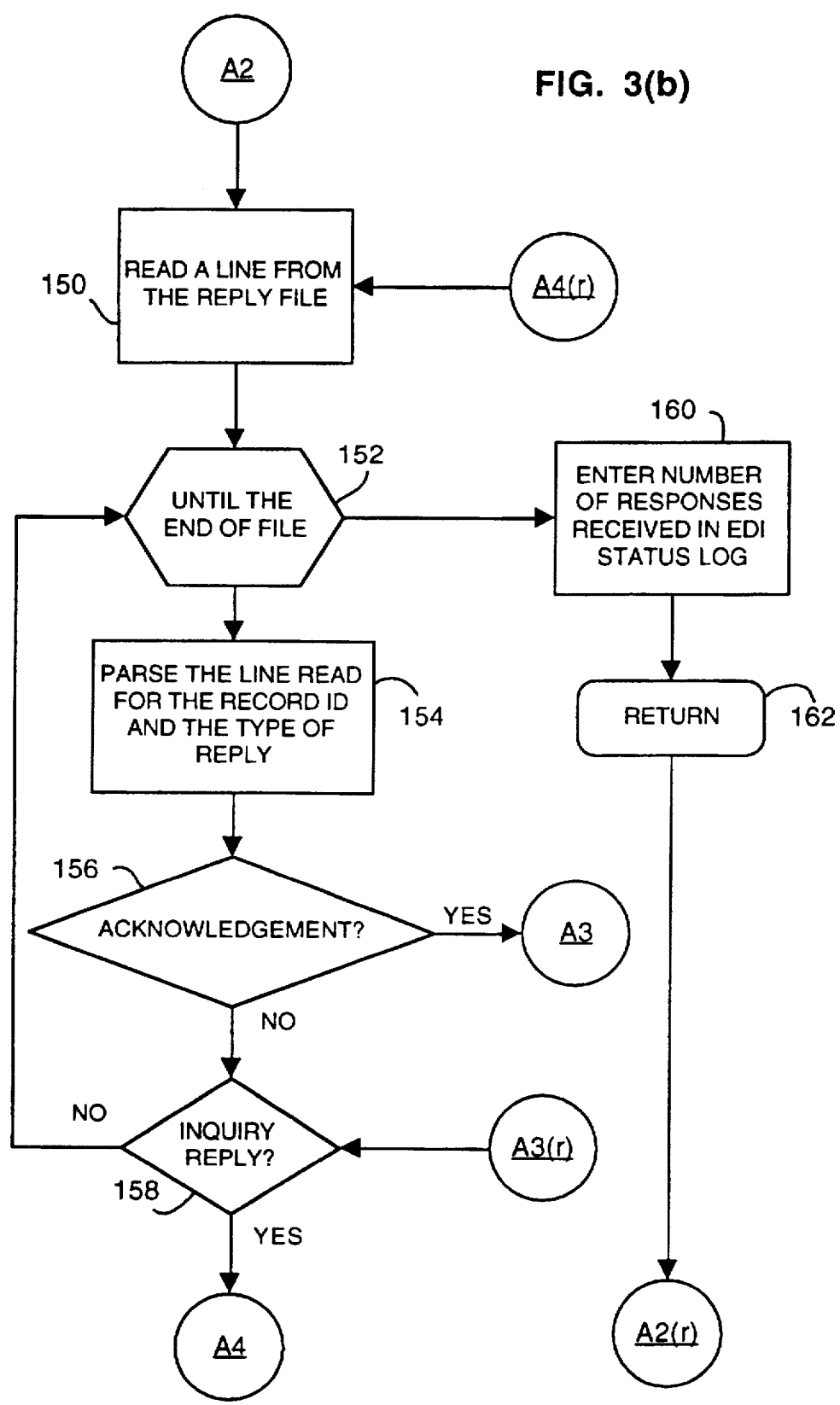
FIG. 3(b) is a flowchart of the Trace Replies program.

FIG. 3(b) illustrates the flow of the Trace Replies program. If a reply to a previous E.O.D. inquiry, or if an acknowledgment to a previous E.O.D. manifest transmission, is transmitted to the system during the S.O.D. process, then the reply will be parsed line by line in step 150 until the end of the file is reached at step 152. At the end of the file, the number of responses actually received is totaled and entered into the EDI status log at step 160. When the number of responses has been entered, the process returns at step 162 to step 140 as shown in FIG. 3(a), where it is subsequently returned to step 110 as shown in FIG. 3. As we have seen, step 152 proceeds to step 160 when it has data to be counted. However, when step 152 is unsure of a response's status, it will proceed to step 154 where the routine will parse the line read for the record Identification (record I.D.) and for the type of reply that was received to determine whether the reply is an acknowledgment of a manifest or the transmission of a query.

Figure 3C:
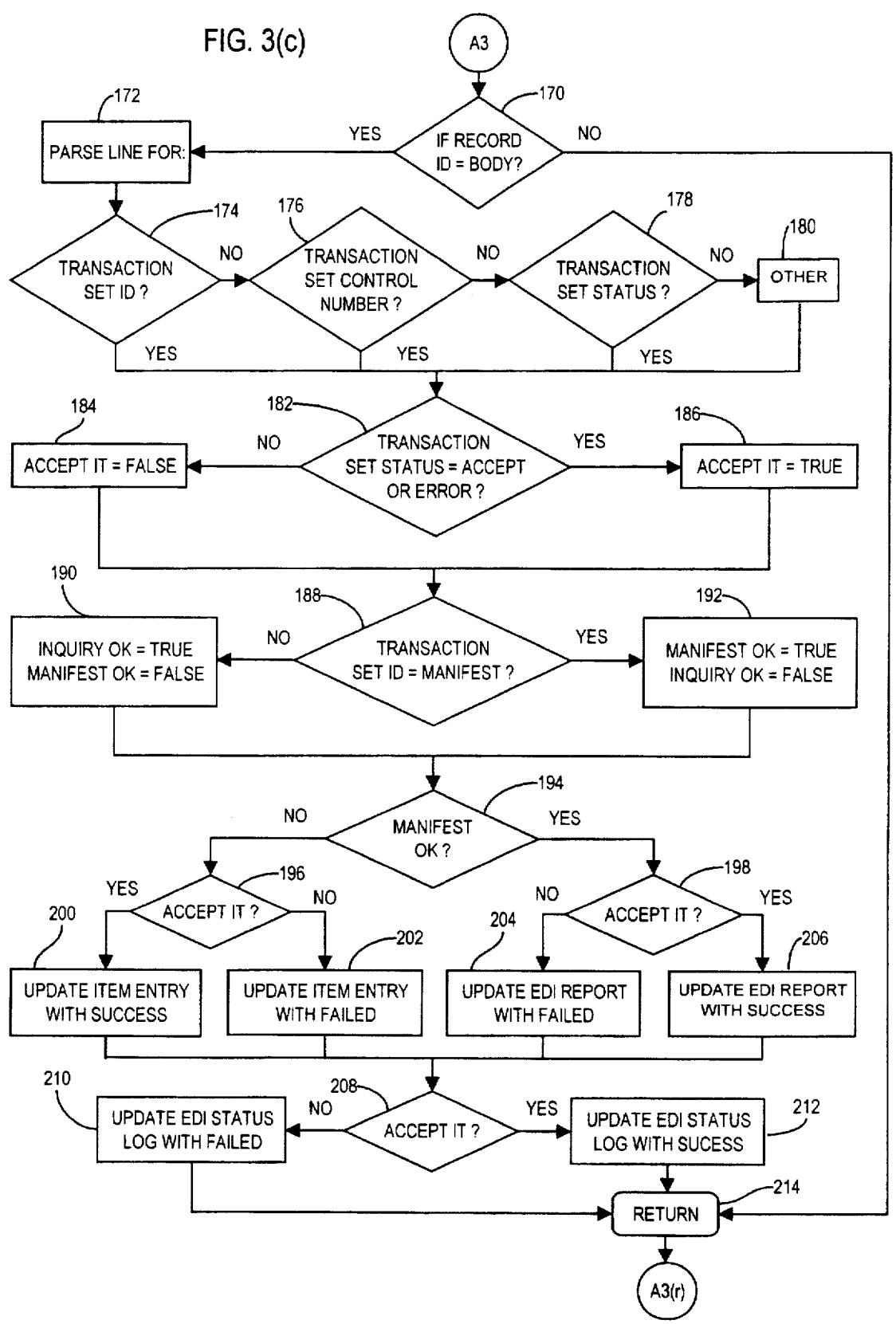
FIG. 3(c) is a flowchart of the routine for acknowledgment of the required reply type requested within the Trace Replies program.
Figure 3D:
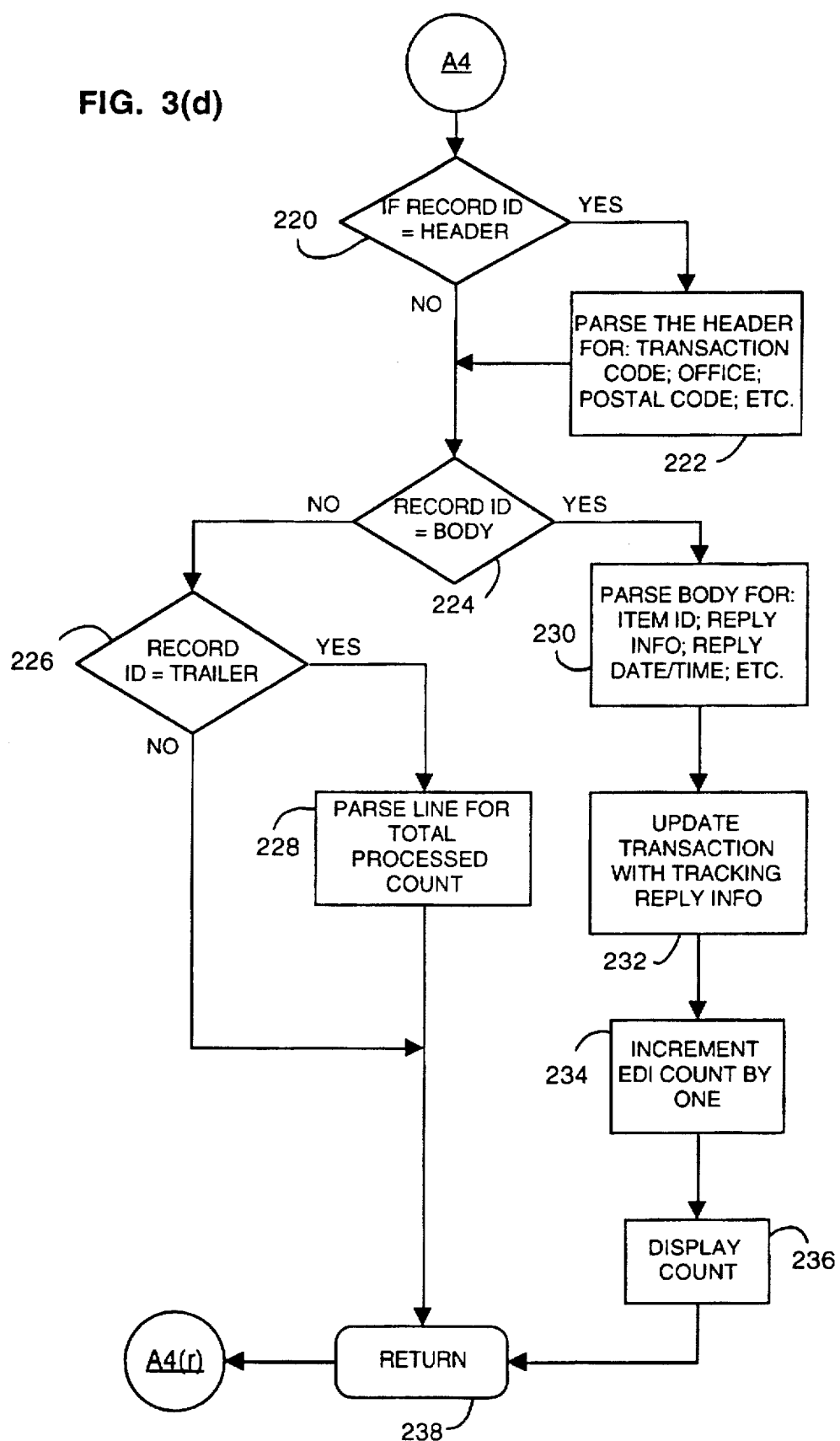
FIG. 3(d) is a flowchart of the routine for acknowledgment of an inquiry reply.

If the routine determines, as shown in FIG. 3(b) at step 156, that an acknowledgment was received, then the routine will move to step 170 as shown in FIG. 3(c). If the response is "No" at step 156, then the routine will ask if the received message is an inquiry reply; if "Yes," then the routine will proceed to step 220 as shown in FIG. 3(d). If the response is "No" to the query of step 158, then the routine returns to step 152.

FIG. 3(c) further continues the Trace Replies program. At step 170, the routine inquires as to whether the Record ID is in the body of the text. If the response is "No," then the routine proceeds to step 214 where it returns to step 158; otherwise, if the response is "Yes," then the routine proceeds to step 172 where the record I.D. is parsed until a transaction set I.D. is detected. The routine inquires, at step 174, as to whether the transaction set I.D. has been detected. If a transaction set I.D. is detected, then the routine proceeds to step 182. If the response to the query at step 174 is "No," then the routine inquires at step 176 as to whether or not a transaction set control number is present. If "Yes" is the response at step 176, then the routine proceeds to step 182; if "No," then the routine inquires as the transaction set status at step 178. If "Yes" is the response at step 178, then the routine proceeds to step 182; if "No," then the routine lists at step 180 other transaction parameters that can be established from time to time. Step 180 proceeds to step 182.

Step 182 is an inquiry to the system as to the transaction set status. The system will make the choice as to whether it will accept ("Yes") the transaction set, or whether the transaction set represents an error ("No"). If the system accepts the transaction set, then it will proceed to step 186 where the decision to accept is confirmed to the system as a true statement and the routine progresses to step 188. If the system does not accept the transaction set, then the transaction set is confirmed as false and the routine progresses to step 188.

Step 188 is an inquiry to the system as to whether the transaction set ID indicates a manifest. If the response at step 188 is "Yes," then the routine confirms this to the system by indicating that "Manifest O.K." is true and that "Inquiry O.K." is false; then the routine progresses to step 194. If the response at step 188 is "No," then the routine confirms this to the system by indicating that "Manifest O.K." is false and that "Inquiry O.K." is true; then the routine progresses to step 194.

Step 194 is the fifth of a series of five queries concerning the manifest transmission. If the manifest is determined to be "O.K." at step 194, then the routine will ask the system if it wants to accept or reject the manifest at step 198. If the answer is "Yes," then the routine moves to step 206. At step 206, the EDI report is updated to reflect a successful transmission; then the routine progresses to step 208. If the answer is "No" at step 198, then the routine moves to step 204 where the EDI report is updated to reflect a failed transmission, then the routine progresses to step 208.

If it is determined that the manifest was not "O.K." at step 194, thus indicating an inquiry response, then the routine will ask the system if it wants to accept or reject the inquiry at step 196. If the answer is "Yes," then the routine moves to step 200. At step 200, the EDI report is updated to reflect a successful transmission of the inquiry item; then the routine progresses to step 208. If the answer is "No" at step 196, then the routine moves to step 202 where the EDI report is updated to reflect a failed transmission of the inquiry item, then the routine progresses to step 208.

At step 208, the system will write the appropriate data item status to the EDI status log and will accept or reject the individual reports based on their success or failure. Transmission failure was addressed at step 130 where the S.O.D. communications status is displayed to the user and written to the status log. If the system rejects the report, then the EDI status log is updated at step 210 with an indication of transmission inquiry failure. If the system accepts the report, then the EDI status log is updated at step 212 with an indication of a successful transmission. The routine then returns at step 214 to step 158 as shown in FIG. 3(b).

If the inquiry reply at step 158 was "Yes," then the routine for the Trace Replies program advances to step 220 as shown in FIG. 3(d) so as to process the inquiry responses. Step 220 queries the system to determine if the Record I.D. was a header. If the response is "Yes," then the system parses the header at step 222 for: transaction code; office location; postal code; or other header entries allowed by the system and defined in the selected EDI standard; the routine then moves to step 224. If the response to the query at step 220 was "No," then the routine advances to, and asks at, step 224 if the Record I.D. was indicative of the body of a transmission.

If "Yes" at step 224, then the routine will parse the body for: an item I.D.; reply information; a reply date and time; etc., as defined in the selected EDI standard, and advance to step 232. At step 232, the routine will update the transaction with tracking reply information, then increment the EDI transmission count by one at step 234. The then current count will be displayed on monitor 16 to the system user. The system operator would then press "RETURN" at step 238 and return to step 150 as shown in FIG. 3(b).

If "No" at step 224, then the routine will determine at step 226 if the Record I.D. is a trailer. If "Yes," then the system will parse the line for a total processed count at step 228 and return at step 238 to step 150. If "No," then the routine will progress to step 238 and return to step 150.

Figure 4:
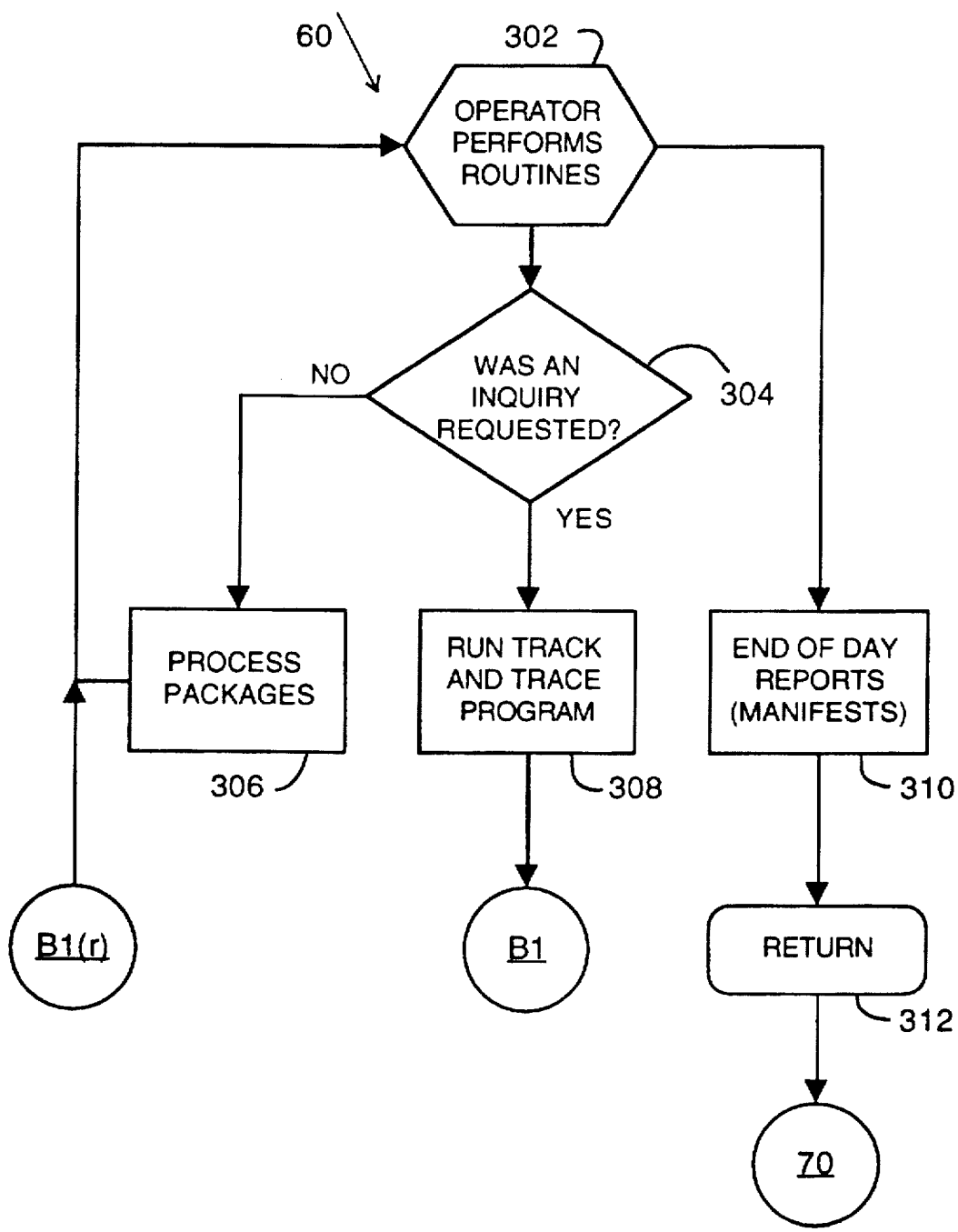
FIG. 4 is a flowchart of the of the standard routines to be performed by the system operator.

After the system has progressed through the required routines of the Start of Day program in step 50, the system returns via step 108 to step 60. Step 60, whose flow is detailed in FIG. 4, represents the normal routines and procedures of the system operator. These are well known in the art and their full range and scope will not be elaborated upon here. However, there are two routines that are important to the flow of the inventive steps. First, during the course of the system operator's activities, it might be necessary to request an inquiry of the system to determine the status of EDI message traffic; and second, at the end of the day, or upon request, the system operator can request that the End of Day routine (Manifest) be run.

Figure 4A:
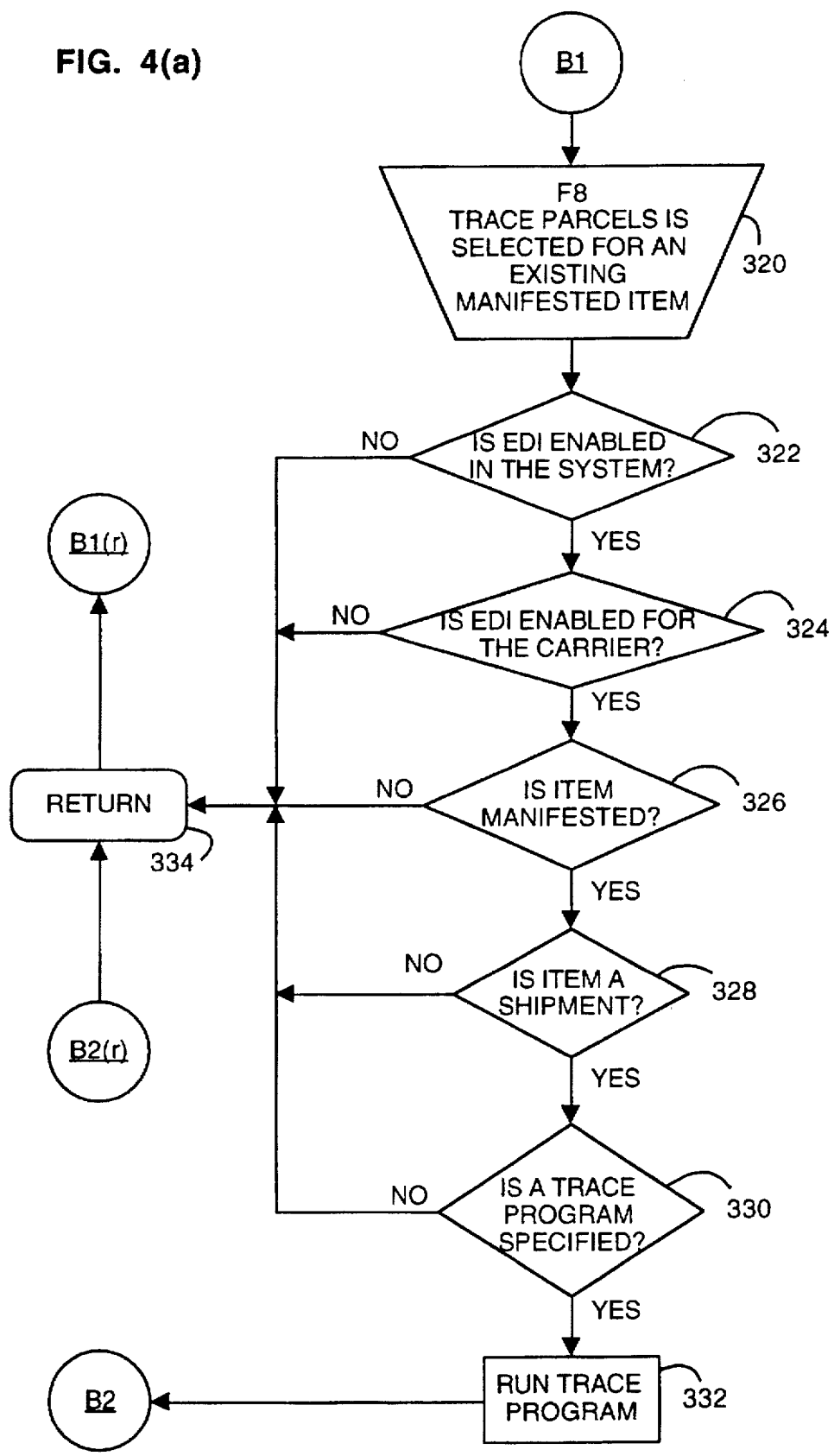
FIG. 4(a) is a flowchart of the of the steps taken to initiate a Track and Trace.

The system will ask if an inquiry has been requested at step 304. If "Yes," then the routine will progress to step 308 and allow the operator to select the Track and Trace program from a system menu displayed to the system operator on monitor 16. The system operator would (press key F8 in the E900 carrier management system) access the program at step 320 as illustrated in FIG. 4(a). If the response to the query at step 304 is "No," then the system operator would continue processing packages in the carrier management system in step 306 and then other routine duties in step 302.

FIG. 4(a) illustrates the routine for getting into and through the Track and Trace program. Trace Parcels is selected at step 320 for an existing manifested item. The routine then poses, at step 322, the query: "Is EDI enabled in the system?" If the response to step 322 is "Yes," then a second query is posed at step 324: "Is EDI enabled for the carrier?" Step 324 is important because even though a particular carrier management system might have the EDI capability, the carrier selected by the shipper must also have the capability. In addition, certain carriers might charge additional fees EDI service, so it should be possible to shut the capability off with respect to certain vendors depending on the ability or desire to pay the EDI fees.

After determining that EDI has been enabled both in the system (step 322) and for the chosen carrier (step 324), the system will ask at step 326 if the item to be traced has been manifested. This step is required to determine if the item to be traced has been prepared for shipping, or whether the package might still be "in-house." If the response to step 326 is "Yes," then the routine asks at step 328 if the item to be traced is "a shipment." If "Yes," then the routine asks at step 330 if a Trace Program has been specified. If a Trace Program has been specified to the system, then the routine will progress to step 332 and run the Trace program as detailed in FIG. 4(b) and FIG. 4(c). When the Trace program is completed, or if "No" was the response to any of the queries in steps 322 through 330, then the routine returns at step 334 to step 302 as shown in FIG. 4.

Figure 4B:
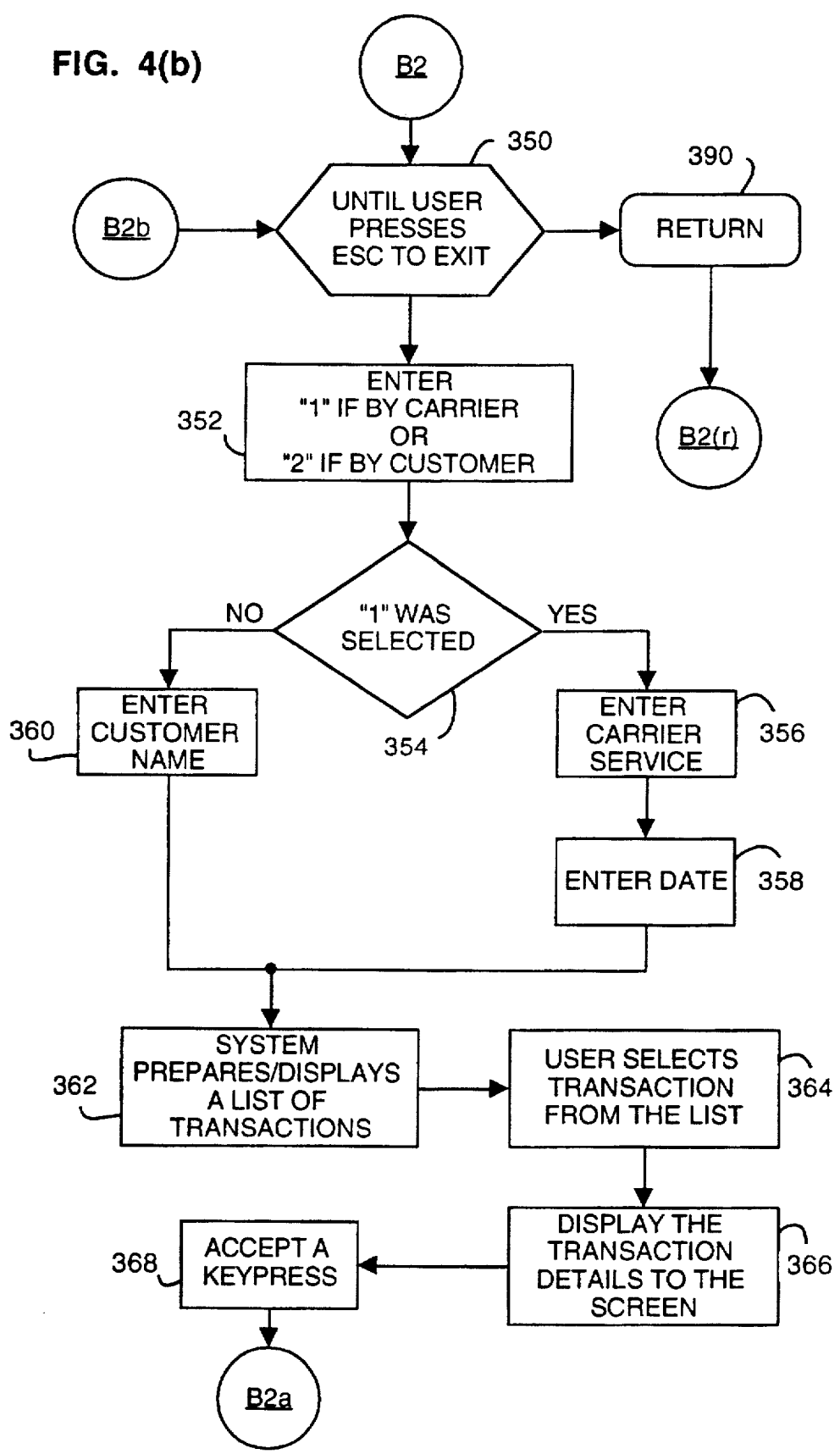
FIGS. 4(b) and FIG. 4(c) is a flowchart of the Trace program.
Figure 4C:
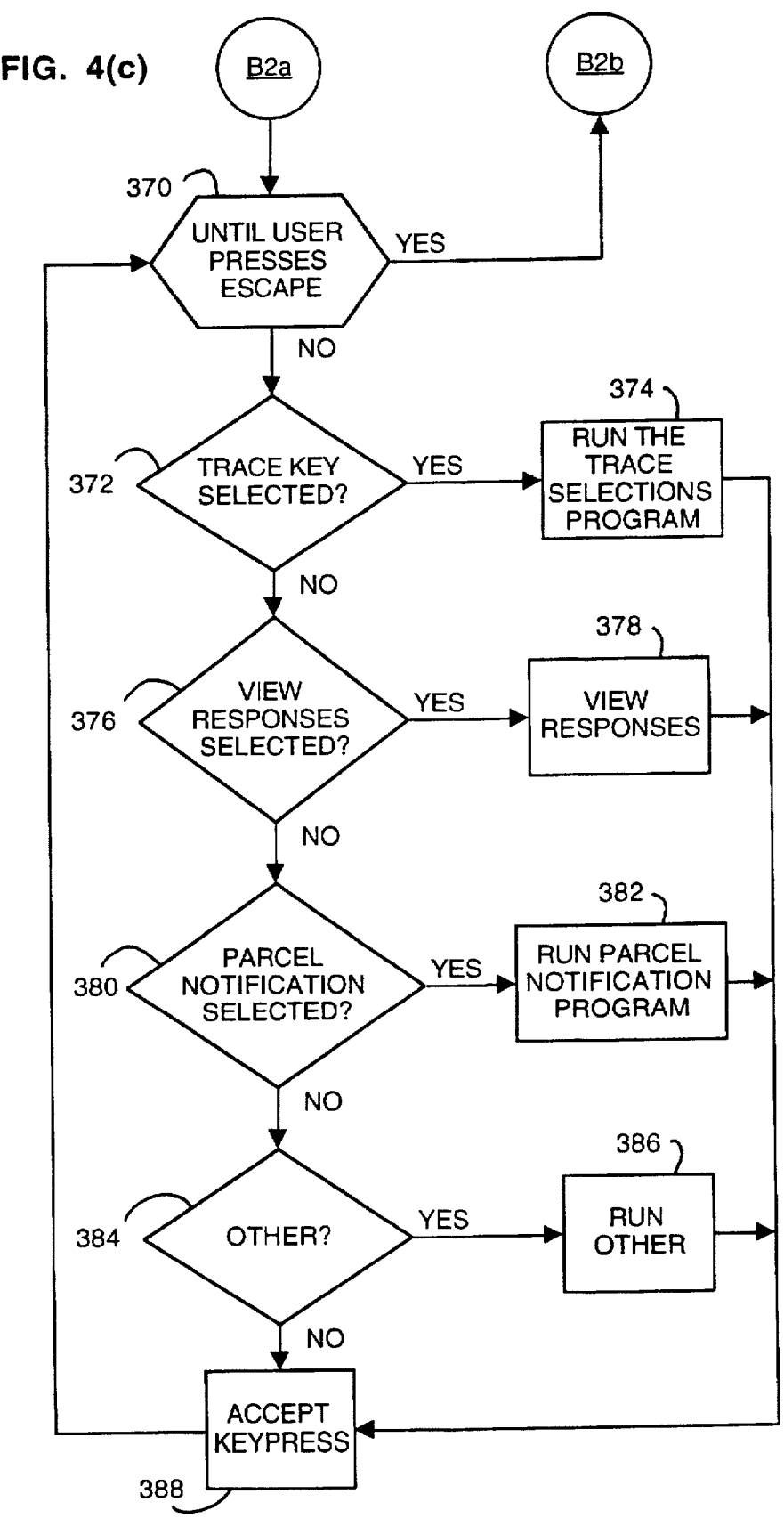

If a Trace program is run at step 332, then the routine progresses to step 350 as shown in FIG. 4(b). At step 350 a condition is established whereby the routine will progress until such time as ESCAPE is pressed by the system operator. If the system operator presses ESCAPE, then the routine progresses to step 390 where it will return to step 334; otherwise, it will move on to step 352 where the system operator is prompted to enter "1" if the shipment is being traced according to the carrier, or "2" if the shipment is being traced based on the customer (receiving party). Upon entry of "1" or "2" by the system operator, the program queries at step 354 as to whether "1" had been selected. If the response is "Yes," then the system operator enters the appropriate carrier service at step 356 and the date of the shipment at step 358; the routine then advances to step 362. If the response to the query at step 354 was "No," then the routine requests that the system operator enter the customer name at step 360, and then the routine advances to step 362.

At step 362, the system prepares a list of the transactions for the given customer or carrier and simultaneously displays these via monitor 14 to the system operator. The system operator will select the appropriate transaction from the list at step 364 and press ENTER to obtain a listing of the transaction details. The transaction details are displayed to the system operator at step 366 and the system operator presses any key on keyboard 16 at step 368, whereupon the routine advances and the system establishes a condition at step 370 for the routine that allows the operator to continue to the next step unless ESCAPE is selected. If ESCAPE is selected, then the routine returns to step 350.

If any other key is selected, then the routine progresses to step 372 where the system operator can select the Trace Key. If the Trace Key is selected, then the routine will run the Trace Selections program at step 374. If the Trace Key is not selected, then the routine will look to see at step 376 if the View Responses Key has been selected; if the View Responses Key has been selected, then the system will run the View Responses program at step 378. If the View Responses Key is not selected, then the routine will look to see at step 380 if the Parcel Notification Key has been selected; if the Parcel Notification Key has been selected, then the system will run the Parcel Notification program at step 382. If the Parcel Notification Key is not selected, then the routine will look to see at step 384 if any additional program keys (if any are enabled) have been selected; if an additional program has been selected, then the system will run that program at step 386.

Once each of the steps 374, 378, 382, and 386 are completed, the routines will return to the Trace Program by pressing any key at step 388. The routine then returns to step 370 where selections can be made or ESCAPE can be selected. IF ESCAPE is selected at step 370, then the routine returns to step 350 of the Trace Program where a new transaction may be selected by advancing to step 352, or ESCAPE may be selected whereupon the routine returns at step 390 to step 334 of FIG. 4(a), and from there returns to step 302 as shown in FIG. 4.

Figure 5:
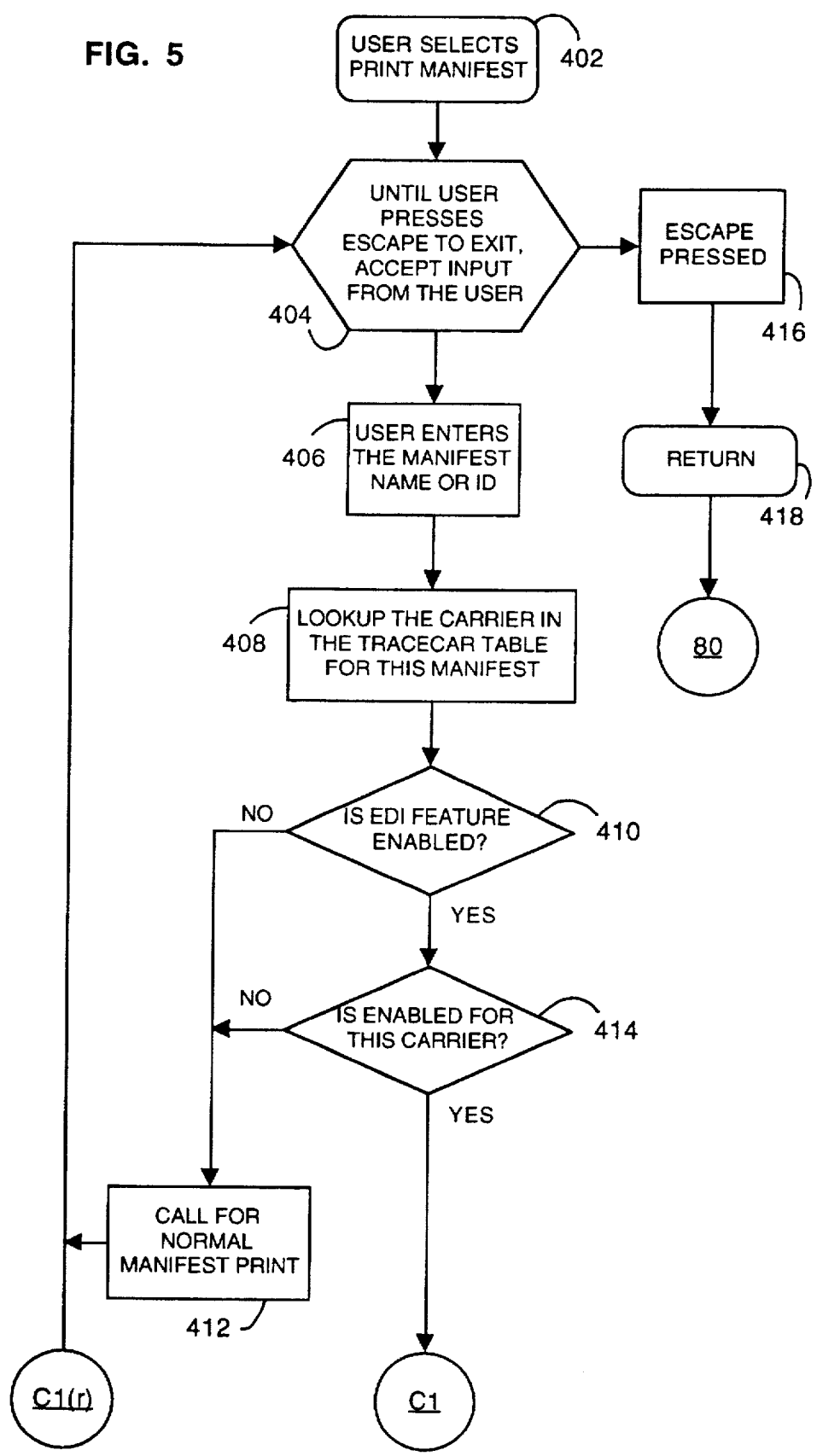
FIG. 5 is a flowchart of the routines required to initiate the End of Day processing program.

In FIG. 4, if the system operator proceeds to step 310 and is prepared to run the End of Day reports which include the manifest, then the system operator will select RETURN at step 312 and proceed to step 70. At step 70, the system user is presented on monitor 16 with a list of menu items. The system operator begins at step 402, as illustrated in FIG. 5, with the selection of "Print Manifest." After choosing Print Manifest, the system decides at step 404 that it will continue to accept input from the system, beginning with step 406, or until ESCAPE is selected in step 416.

Figure 5A:
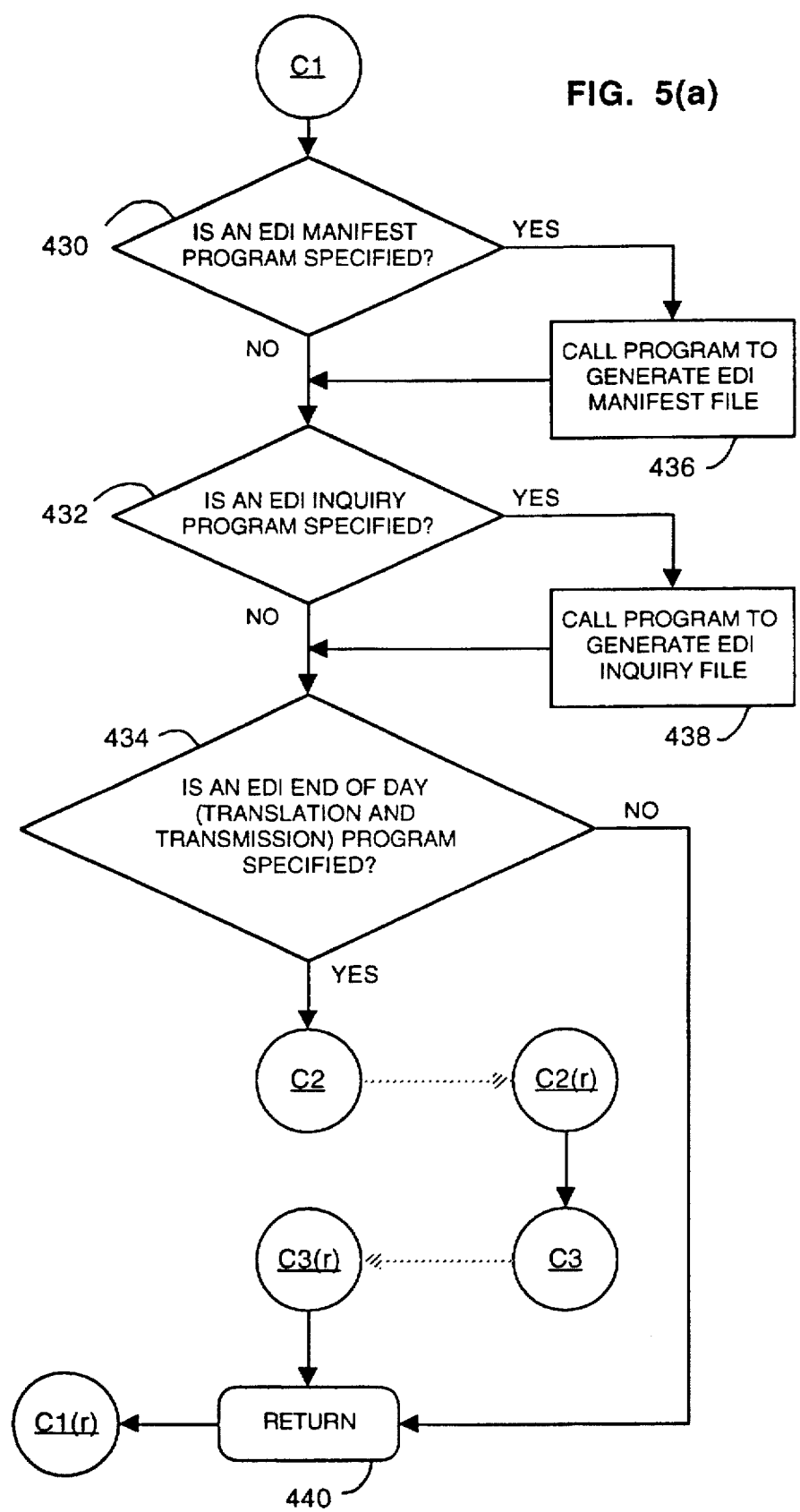
FIG. 5(a) is a flowchart of the routines required to utilize the system's EDI functions.

To print the manifest, the user at step 406 enters the manifest name or I.D. The system will look up the carrier in the TRACECAR Table (FIG. 7A and 7B) for the selected manifest. Once the carrier has been looked up, the routine proceeds to step 410 and asks if the EDI feature has been enabled within the carrier management system. If the response to the query in step 410 is "Yes," then the routine asks at step 414 if EDI has been enabled for the selected carrier. If "Yes," then the routine proceeds to step 430 as shown in FIG. 5(a). If the response to the queries in steps 410 and 414 is "No," then the routine moves to step 412 which calls for a normal manifest print by printer 24. Once a manifest print or an EDI manifest transmission has been called for, the routine returns to step 404 where the system operator can continue to process other manifests or can select ESCAPE at step 416 which will allow the system to return via step 418 to step 80 where the system operator can log out for the day.

Turning to FIG. 5(a), the routine queries at step 430 as to whether an EDI manifest program has been selected. If "Yes," then the program that generates the EDI manifest file is called at step 436 and the routine advances to step 432. If "No" was the response to the query at step 430, then the routine progresses directly to step 432.

At step 432, the system asks whether or not an EDI inquiry program has been specified. If "Yes," then the program that generates the EDI inquiry file is called at step 438 and the routine advances to step 434. If "No" was the response to the query at step 432, then the routine progresses directly to step 434.

Figure 5B:
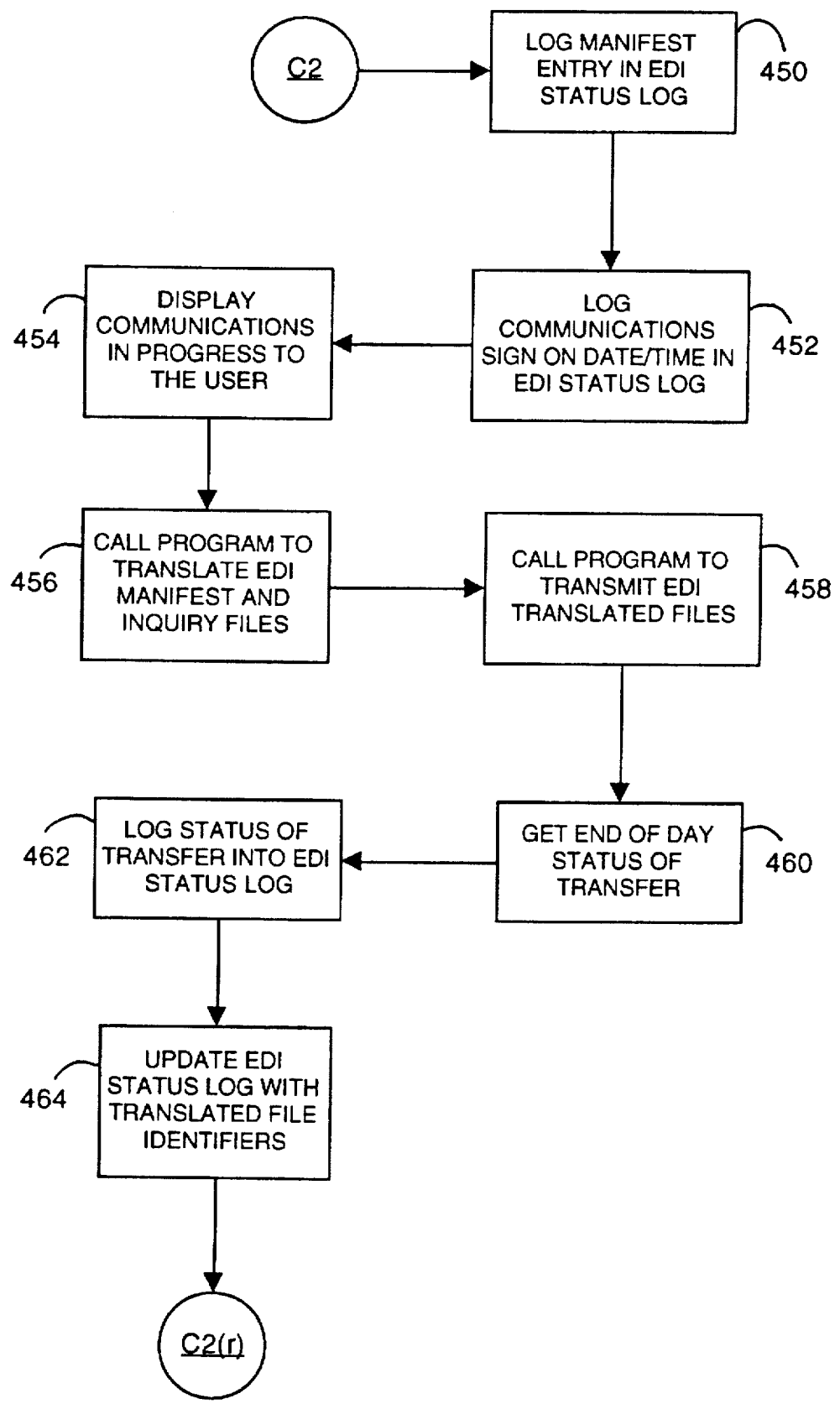
FIG. 5(b) is a flowchart of the of the routine for communication that follows specification of the EDI End of Day program.

Step 434 queries the system to find out if an EDI End of Day program has been specified. This program is an EDI translation and transmission program. If the response is "No," then the routine returns at step 440 to step 404 of FIG. 5. If the response to step 434 is "Yes," then the routine proceeds to step 450 of FIG. 5(b).

At step 450, the system will log the manifest entry into the EDI status log then proceed to step 452 where the communication start time will also be logged into the EDI status log. The manifest transmission will begin and a message will be displayed on monitor 16 to the system user indicating that there is a communication in progress. The system will call up in step 456 an EDI translation program to translate the EDI manifest and inquiry files; then, in step 458, the system will call a communications program, such as the commercially available CarbonCopy which is available from Microcom of Norwood, Mass., to transmit the translated EDI files.

Figure 5C:
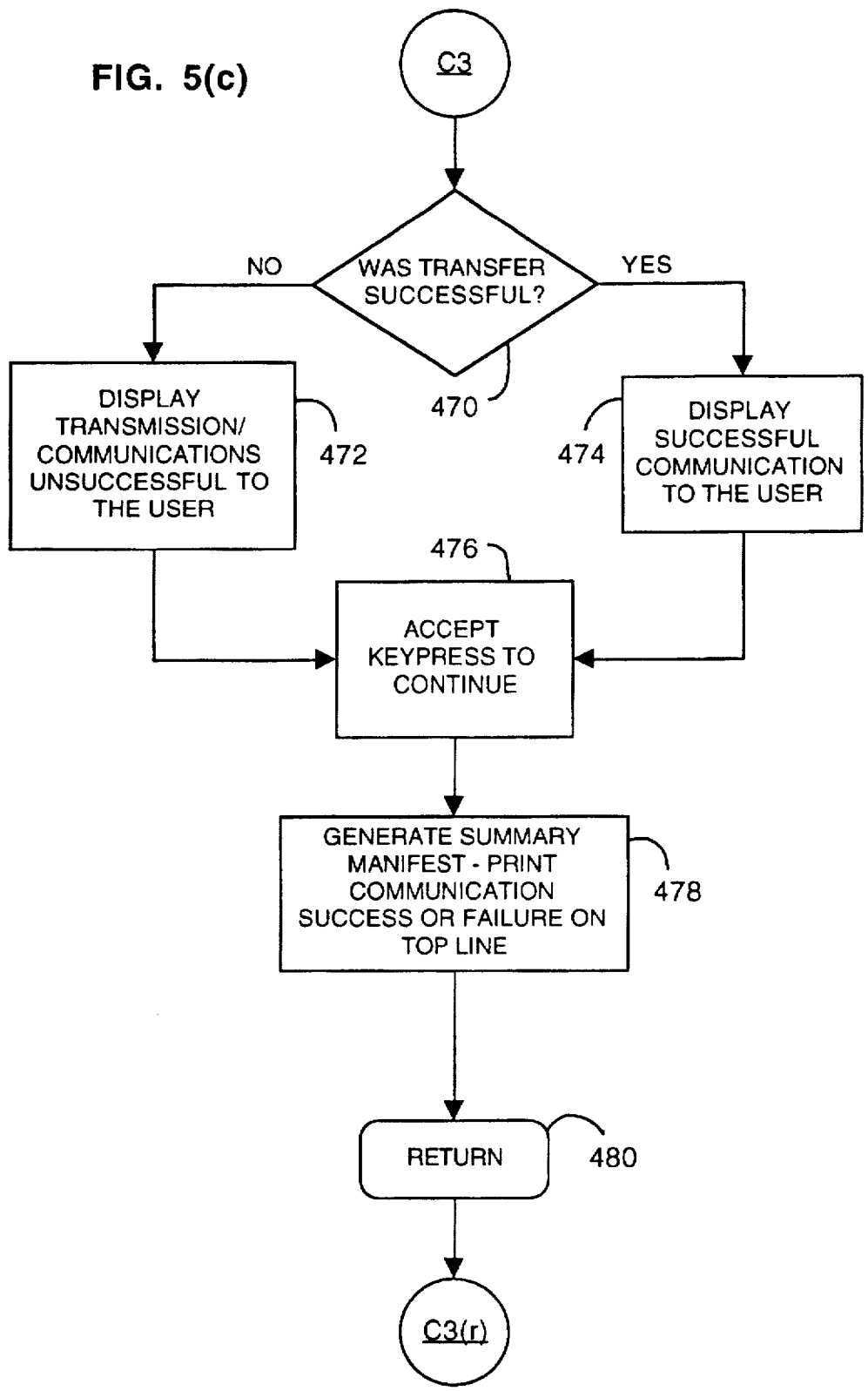
FIG. 5(c) is a flowchart of the routine that immediately follows an EDI communication and up to the point of summary manifest generation.
Figure 6:
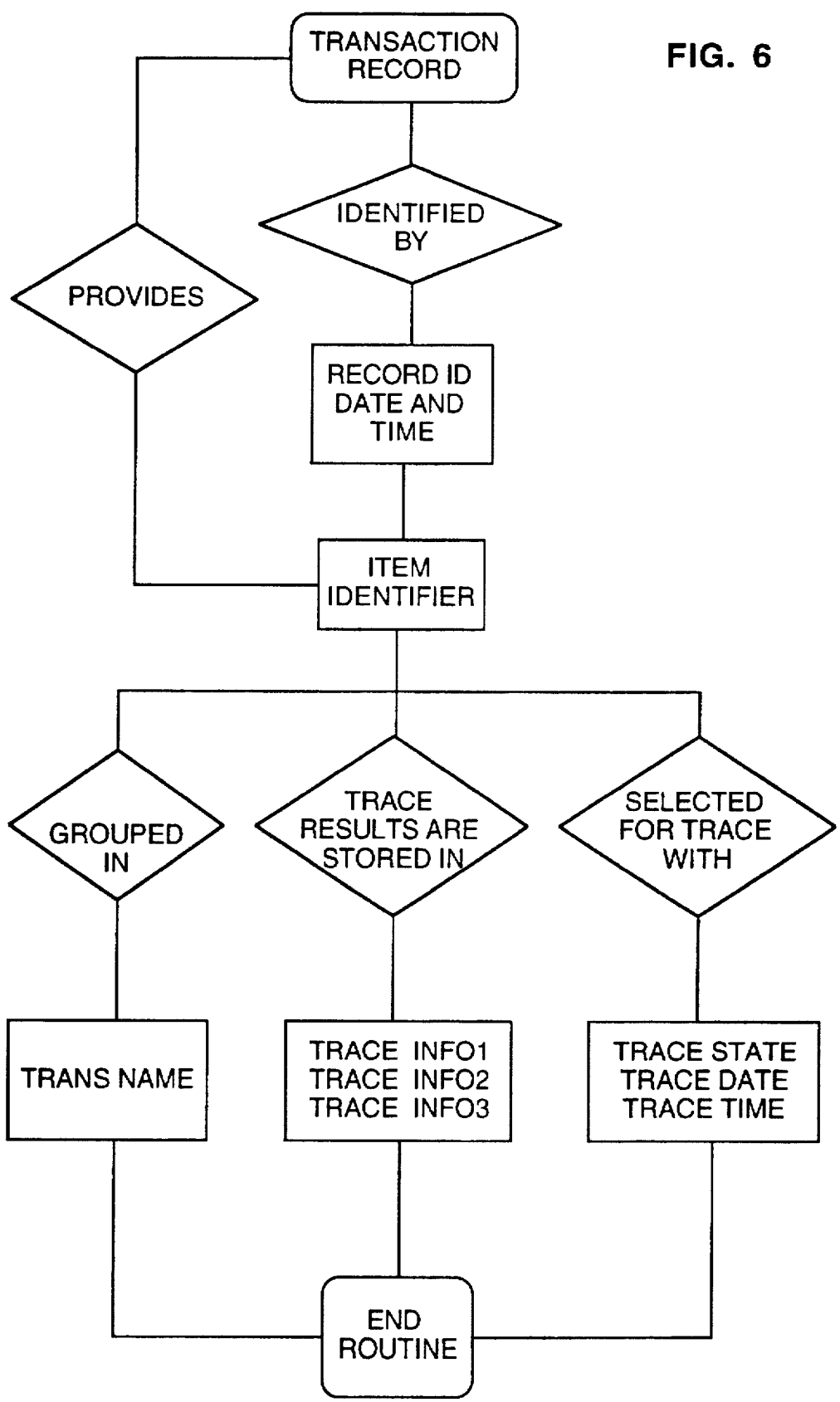
FIG. 6 is an entity relationship diagram for the Tracing Database.

Upon completion of the transmission process, the routine moves to step 460 where an End of Day status of the file transfer is obtained. The status is logged into the EDI status log at step 462 the EDI status log is updated with the translated file identifiers at step 464. At this point, the routine proceeds to step 470 as shown in FIG. 5(a) and subsequently in FIG. 5(c).

Step 470 inquires as to whether the transfer of files, via the transmission means, was successful. If "Yes," the routine displays at step 474 a "Successful Communication" message to the system user via monitor 16; then, the routine proceeds to step 476 where the system will accept a "keypress" to continue. If the response to step 470 is "No," then the routine displays at step 472 an "Unsuccessful Communication" message to the user via monitor 16; then, the routine proceeds to step 476 where the system will accept a "keypress" to continue.

After accepting a "keypress," the routine will generate a summary manifest at step 478 for the benefit of both the shipper and the carrier. The success or failure of the transmission will appear on the top line of the summary. After printing of the summary manifest, the system operator can return, via step 480, to step 440 as shown in FIG. 5(a). At step 440, the routine returns to step 404 as shown in FIG. 5. If the system operator chooses to press ESCAPE (step 416) at this point, then the routine will return to step 80 for logout by the system operator.

Figure 7A:
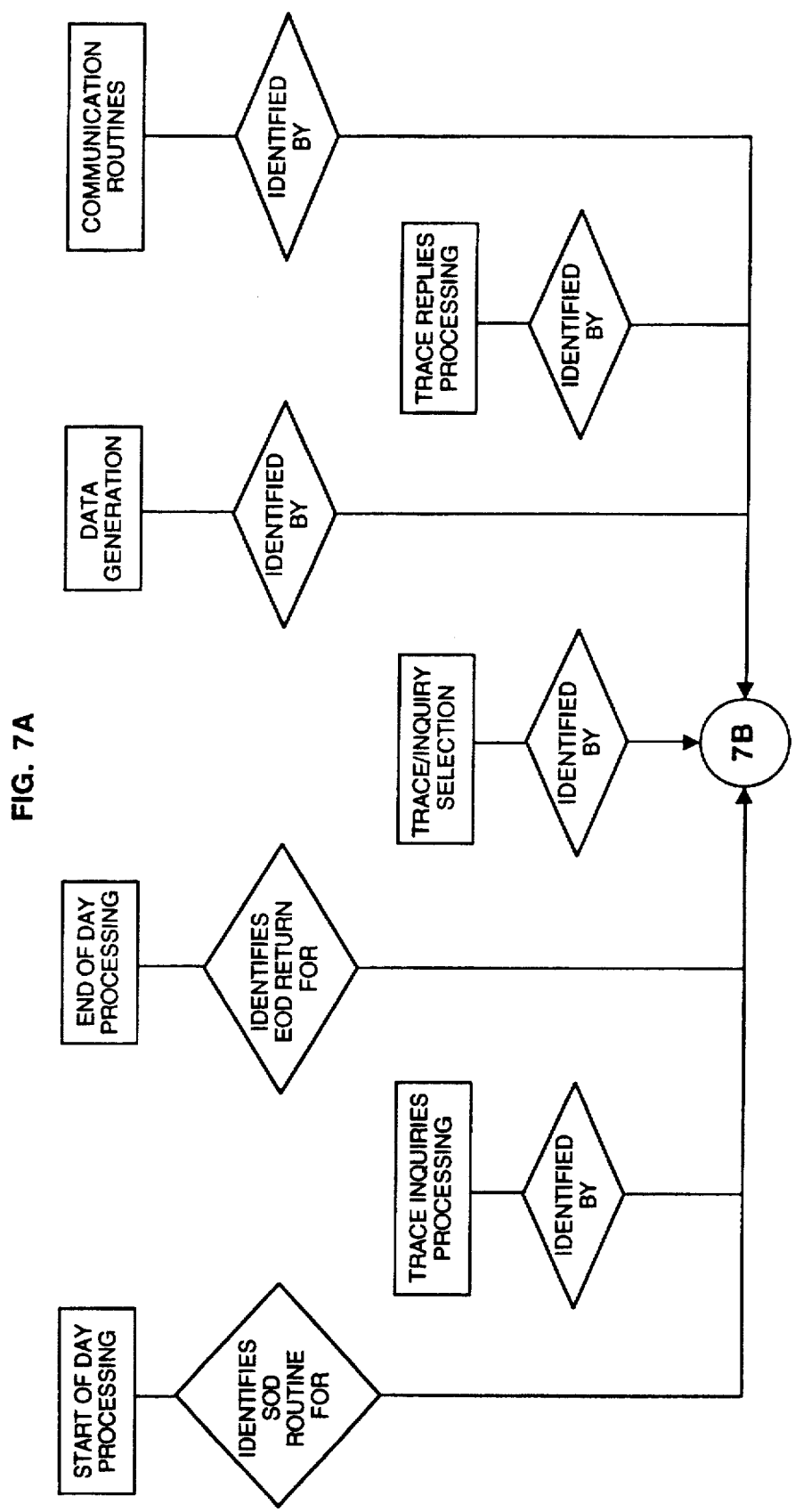
FIGS. 7A and 7B is an entity relationship diagram for the Traceable Carriers Database.
Figure 7B:
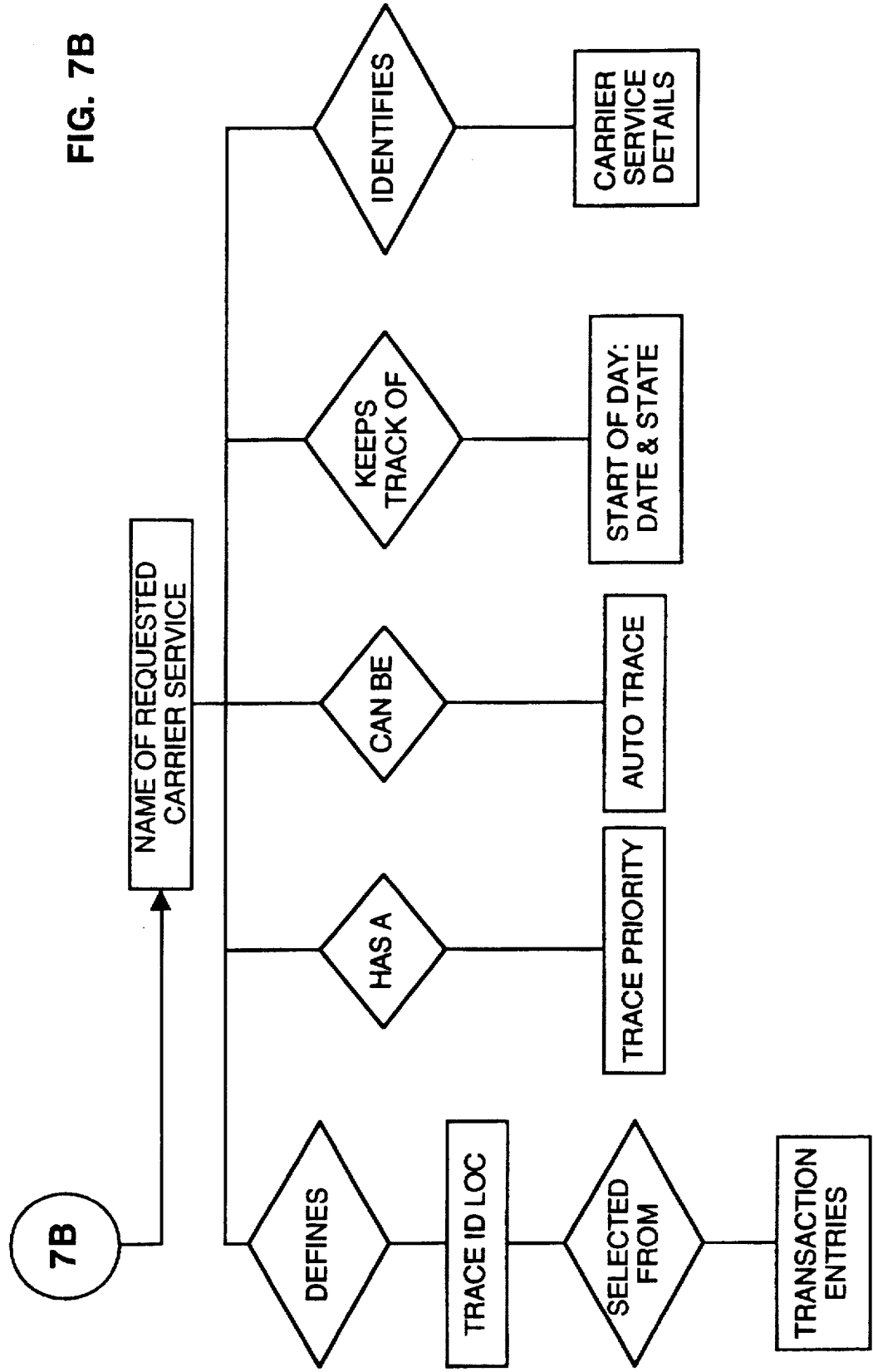

The flexibility of this system resides in the design and implementation of the Traceable Carriers Database (TRACECAR) as illustrated in the entity diagrams of FIG. 7A and FIG. 7B. TRACECAR provides a repository for the names of the programs defined for each EDI Carrier to execute for the Start of Day; End of Day; Trace Inquiries, Trace Responses, Trace Parcels, and Manifest Processes and any other routines which can be linked with carrier data. These programs can be written in a language such as DATAFLEX, or in any other language appropriate to the task. These programs are called at predefined locations in the application (e.g. steps: 234; 308; 332; and 350). TRACECAR also holds the Start of Day program status and location of the Track and Trace ID.

Preferably, the host carrier management system 10 will allow the system user to select from among multiple carriers/hosts; therefore, there are multiple Start of Day routines to process. The Traceable Carriers Database allows for Start of Day routines 50 to be defined on a carrier basis, a carrier service basis, or not to be defined. Those Start of Day procedures 50 which are defined will be automatically initiated from the MENU program after the initial LOGON procedure, or after any LOGON procedure following the NEW USER menu item, provided that the Start of Day routine 50 has not been successfully concluded (completed) for the given date. Start of Day processing selects the Start of Day routines based upon the Carrier Service order defined in the Traceable Carriers Database. Because there are multiple Start of Day routines, and because these routines are called until successfully completed in a given date, the user will be given the opportunity to exit the Start of Day processing.

As can be appreciated by those skilled in the art, a number of variations of the subject invention are possible. These variations include, but are not limited to: the range of programs that can be established to invoke the use of EDI; the use of the subject invention within a Value Added Network (VAN) that allows subscribers to access predefined mailboxes of other subscribers; the range of carrier information that can be reduced to a database format and used as tracking and tracing criteria; and the forms of peripheral hardware that are employed by the host carrier shipping system 10. Accordingly, limitations on the scope of the subject invention are found only in the claims set forth below.

What is claimed is:

1. A method for implementing one of a plurality of electronic data interchange standards to process documentation in a parcel processing system, comprising:

(a) enabling a parcel processing system to utilize one or more of a plurality of electronic data interchange standards when in communication with a corresponding parcel processing system;

(b) selecting a first carrier from among a list of carriers, wherein said selection is made based upon pre-selected criteria;

(c) determining whether said selected carrier possesses an electronic data interchange capability necessary for said corresponding parcel processing system;

(d) rejecting said selected carrier if said selected carrier does not possess a corresponding electronic data interchange capability, and determining a next available carrier meeting said pre-selected criteria;

(e) accepting said selected carrier or said next available carrier if said selected carrier or said next available carrier possesses a corresponding electronic data interchange capability;

(f) selecting an electronic data interchange standard that is compatible with said electronic data interchange capability of said accepted carrier;

(g) reading from a database those fields necessary to construct a manifest in a format in conformance with requirements of said accepted carrier;

(h) translating said constructed manifest into an electronic data interchange standard that matches that of said accepted carrier; and (i) transmitting said translated manifest to said accepted carrier by transmission means for reception by said corresponding parcel processing system.

2. The method of claim 1, wherein a confirmation of said transmission is received by said parcel processing system from said corresponding parcel processing system and said received confirmation is recorded as received.

3. The method of claim 1, whereby an End of Day process is employed to construct said manifest, the process comprising:
   (a) selecting said End of Day process for a particular carrier from a program menu and initiating said End of Day process;
   (b) selecting an electronic manifest, paper manifest, or both from within the End of Day process, and if selecting an electronic manifest:
      (i) searching among a plurality of memory locations within said parcel processing system for said necessary fields to construct a manifest in a format in conformance with said requirements of said selected carrier;
      (ii) constructing said electronic manifest;
      (iii) translating said constructed electronic manifest into an electronic data interchange standard that matches that of corresponding parcel processing system at said particular carrier;
      (iv) selecting a transmission program for transmitting said translated manifest;
      (v) running said transmission program;
      (vi) transmitting said electronic manifest by transmitting means to said corresponding parcel processing system at said particular carrier; and
      (vii) displaying to a system operator the status of said transmission of said translated manifest.

4. The method of claim 3, wherein the step of displaying is performed by an electronic printer.

5. The method of claim 3, wherein the step of displaying is performed by a monitor or remote display unit.

6. The method of claim 3 wherein said transmitting means comprises a modem operatively linked to the public switched telephone network.

7. The method of claim 3 wherein said transmitting means comprises a direct link to the receiving means.

8. The method of claim 1 wherein said corresponding parcel processing system comprises:
   (a) receiving means;
   (b) translation means; and
   (c) display means.

9. The method of claim 8 wherein the receiving means includes a modem operatively connected to a system for handling the processing of said electronic manifest.

10. The method of claim 8, wherein said electronic manifest is received and translated by a translation program that puts said electronic manifest into a format readable and understandable by a designated next destination.

11. The method of claim 8 wherein said receiving means, said translation means and said display means are operatively connected to a second parcel processing system.

12. The method of claim 8, wherein said display means is an electronic printer.

13. The method of claim 8, wherein said display means is a monitor or remote display.

14. A method for implementing one of a plurality of electronic data interchange standards to process documentation in a parcel processing system, comprising:
   (a) selecting a carrier from within said parcel processing system from among a plurality of carriers wherein said selected carrier is capable of receiving an electronic manifest;
   (b) requesting of said parcel processing system that said electronic manifest be generated for said selected carrier;
   (c) generating said electronic manifest in accordance with manifest requirements for said selected carrier;
   (d) logging said request for said manifest generation in an electronic data interchange log and notifying a system operator of said request by display means;
   (e) transmitting said manifest to a designated next destination;
   (f) receiving a confirmation of said transmission of said manifest from said next destination; and
   (g) placing said confirmation in a memory location of said parcel processing system to be acted upon by said parcel processing system.

15. The method of claim 14, whereby if said transmission of said manifest is determined not to be successful then said parcel processing system will give said system operator the option of taking back control of said parcel processing system or of having said parcel processing system return to said step of transmitting said manifest.

16. The method of claim 14, wherein said display means is an electronic printer.

17. The method of claim 14, wherein said display means is a monitor or remote display.

18. The method of claim 14 wherein said electronic manifest can be received by said designated next destination comprises:
   (a) receiving means;
   (b) translation means; and
   (c) display means.

19. The method of claim 18, wherein the receiving means includes a modem operatively connected to a system for handling the processing of said electronic manifest.

20. The method of claim 18, wherein said electronic manifest is received and translated by a translation program that puts said electronic manifest into a format readable and understandable by said designated next destination.

21. The method of claim 18, whereby said receiving means, said translation means and said display means are operatively connected to a second parcel processing system.

22. The method of claim 18, wherein said display means is an electronic printer.

23. The method of claim 18, wherein said display means is a monitor or remote display.

24. A method for implementing one of a plurality of electronic data interchange standards to process documentation in a parcel processing system, comprising:
   (a) enabling a parcel processing system to utilize one or more of a plurality of electronic data interchange standards when in communication with a corresponding parcel processing system;
   (b) selecting a carrier based upon a set of pre-selected criteria;
   (c) determining whether said selected carrier possesses an electronic data interchange capability necessary for said corresponding parcel processing system;
   (d) rejecting said selected carrier if said selected carrier does not possess a corresponding electronic data interchange capability, then determining a next available carrier meeting said pre-selected criteria; and accepting said selected carrier or said next available carrier if said selected carrier or said next available carrier possesses a corresponding electronic data interchange capability;

(e) selecting an electronic data interchange standard that is compatible with said electronic data interchange capability of said accepted carrier;

(f) reading from a database those fields necessary to construct an inquiry in a format in conformance with requirements of said accepted carrier;

(g) translating said constructed inquiry into an electronic data interchange standard that matches that of said accepted carrier;

(h) transmitting said translated inquiry to said accepted carrier by transmission means for reception by said corresponding parcel processing system;

(i) receiving a response or a non-response to said constructed inquiry from said corresponding parcel processing system; and (j) updating an EDI report field with said response or with said non-response.

* * * * *